United States Patent
Naccache

(10) Patent No.: US 8,799,670 B2
(45) Date of Patent: Aug. 5, 2014

(54) BIOMETRIC AUTHENTICATION METHOD, COMPUTER PROGRAM, AUTHENTICATION SERVER, CORRESPONDING TERMINAL AND PORTABLE OBJECT

(75) Inventor: David Naccache, Paris (FR)

(73) Assignee: Compagnie Industrielle et Financiere d'Ingenierie "Ingenico", Neuilly sur Seine (FR)

(*) Notice: Subject to any disclaimer, the term of this patent is extended or adjusted under 35 U.S.C. 154(b) by 1053 days.

(21) Appl. No.: 12/250,402

(22) Filed: Oct. 13, 2008

(65) Prior Publication Data
US 2009/0100269 A1   Apr. 16, 2009

(30) Foreign Application Priority Data
Oct. 12, 2007 (FR) .................................... 07 58295

(51) Int. Cl.
*G06F 21/00* (2013.01)
*H04L 9/32* (2006.01)

(52) U.S. Cl.
CPC .................................. *H04L 9/3231* (2013.01)
USPC ........................................................ 713/186

(58) Field of Classification Search
CPC .............................. G06F 21/32; G06F 21/31
USPC ................................................ 713/185, 186
See application file for complete search history.

(56) References Cited

U.S. PATENT DOCUMENTS

| 2002/0087869 A1 | 7/2002 | Kim | 713/186 |
| 2004/0129787 A1* | 7/2004 | Saito et al. | 235/492 |
| 2006/0000891 A1* | 1/2006 | Bonalle et al. | 235/380 |
| 2007/0040017 A1 | 2/2007 | Kozlay | 235/380 |

FOREIGN PATENT DOCUMENTS

| WO | WO 2004/025545 A2 | 3/2004 |
| WO | WO 2004/025545 A3 | 3/2004 |

OTHER PUBLICATIONS

French Search Report from counterpart foreign application No. FR 07/58295.
Electronique International Hebdo. "Biométre: la Vérification se fait maintenant dans la carte Java," Dec. 16, 1999 (XP002483518).

* cited by examiner

*Primary Examiner* — Hadi Armouche
*Assistant Examiner* — Dao Ho
(74) *Attorney, Agent, or Firm* — David D. Brush; Westman, Champlin & Koehler, P.A.

(57) ABSTRACT

A biometric authentication method and apparatus are provided. A user to be authenticated uses a portable object including at least one biometric sensor. The portable object is adapted to cooperate with a terminal. The method includes: capturing, by the portable object, a biometric sample to be compared coming from the user to be authenticated; transmitting, by the portable object, the biometric sample, in a secure form to an authentication server; and determining, by the authentication server, a signature to be authenticated using said biometric sample, then comparing the signature with a reference signature.

12 Claims, 3 Drawing Sheets

BIOMETRIC AUTHENTICATION METHOD, COMPUTER PROGRAM, AUTHENTICATION SERVER, CORRESPONDING TERMINAL AND PORTABLE OBJECT

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of authenticating persons, or where applicable animals, via biometrics.

More precisely, this disclosure relates to the biometric authentication systems based on portable objects, such as chip cards, containing on the one hand secured personal data and on the other hand means of capturing a biometric print.

BACKGROUND OF THE DISCLOSURE

Biometrics is commonly used to identify and/or authenticate persons based on individual physical characteristics.

Such an identification via biometrics, implemented by a biometric authentication system, comprises the three following main steps:
- capturing of a reference biometric sample coming from the authorized person (for example a reference image of an authorized person);
- creation of a reference file, or "reference signature" (which comprises at least one characteristic element of the reference image), by a specific treatment applied to the reference biometric sample, then storage of this reference file;
- verification wherein, in the same way as with the aforementioned steps of capturing and of creating, a capture of a biometric sample to be compared coming from the person to be authenticated and the creation of a file to be compared, or "signature to be compared" is carried out, then a comparison of the reference file with the file to be compared in order to determine their rate of similarity and take the decision that is required.

As such, the information stored is not biometric samples, but mathematical models of these samples that distinguish one biometric sample from another. This model is called a "signature" or a "template".

The creation of a reference signature is carried out during a phase referred to as enrolment (or learning) that groups together the steps of capturing the reference biometric sample, creating and storing the reference signature and storing the information on the identity of the person such as his last name, first name, identifier (personal identification number).

The authentication of a person via biometrics can in particular be based on the measurement (or capture) of at least one of the following biometric samples:
- his fingerprint;
- his palm print (hand print);
- the print of his retina;
- the print of his iris;
- the print of his face (the form of a face);
- etc.

There are biometric authentication systems based on a chip card reader integrating a biometric sensor (for example a fingerprint sensor) and a specialized processor.

According to this known technique, the reference print (or reference image) of the authorized user is stored in the chip of the card and the verification is carried out in the terminal, using the data of this chip card. When the reference print stored in the card agrees with the print to be compared (of the user to be authenticated) captured by the sensor, the card is unlocked and, for example, then authorizes secure electronic transactions.

However, a disadvantage of such a biometric authentication system is due to the fact that the step of verification (wherein the reference signature is compared with the signature to be compared in order to authenticate a user to be authenticated) is implemented in the chip card reader. Consequently, the signatures associated with the prints must be stored at least momentarily in the reader. They can therefore be hacked, altered and/or re-used ("replayed") fraudulently using the reader by an ill-intentioned user.

There are also biometric authentication systems (such as described in for example the document entitled "Biométrie: la verification se fait maintenant dans la carte Java; (Biometrics: the verification is now done in the Java card)" published in "Electronique international Hebdo" on 16 Dec. 1999 under number 373) wherein a chip card, provided with a biometric sensor (for example a thermal print sensor), itself carries out the step of verification. It is then the card that compares the reference signature (corresponding to the reference print) with the signature to be compared (corresponding to the print to be compared), without the latter leaving the card.

As such, because the creation, storage and comparison of the signatures are carried out in the chip card, the reference signatures and the signatures to be compared do not transit by a reading terminal of the chip card (chip card reader, automated teller machine, etc.) the aforementioned problems of authentication security are for the most part solved.

However a disadvantage with this type of biometric authentication chip card is its complexity, and consequently its cost. Indeed, the mathematical treatment for the signature determination and for the comparison is complex, and requires a high degree of calculating power and substantial means of memorization, which are hardly compatible with the objectives of low-cost mass production, and with the dimensions of a chip card or of any other portable object.

Another disadvantage of this approach, from a security standpoint, is that the chip card constantly contains the reference signature, which an ill-intentioned third party could attempt to extract, for example after having stolen the card.

SUMMARY

The general principle of an aspect of the disclosure relates to transferring the creation, the storage and the comparison of the signatures required for the authentication, to an authentication server.

As such, neither the signatures to be compared, or the reference signatures transit through a terminal and/or a communication network, since they are created, stored and compared outside of the latter (for example in the server), thus making it possible to limit the attempts at hacking the terminal, and therefore to secure the authentication.

In addition, since the signatures are not stored in the portable object, and since the calculations for signature determination and comparison are not carried out by the portable object, the invention makes it possible to realize this portable object at low cost.

An aspect of the disclosure therefore proposes a new solution that does not have the disadvantages of prior art, in the form of a biometric authentication method, with an authentication server, of a user to be authenticated, using a portable object comprising at least one biometric sensor, said portable object being adapted to cooperate with a terminal, said method comprising a step of capturing, by a portable object, of a biometric sample to be compared coming from said user to be authenticated.

According to an aspect of the disclosure, the portable object transmits to said authentication server said biometric sample, in a secure form, and said authentication server determines a signature to be authenticated using said biometric sample, then compares it to a reference signature.

As such, it is the authentication server that creates a signature to be authenticated, using a biometric sample transmitted by the portable object, in a secure manner, then which carries out the comparison between the signature to be authenticated and a reference signature.

The main steps in the authentication treatment, i.e. the creation and the comparison of signatures (reference signatures and signatures to be authenticated), are therefore carried out in a secure manner in the server, not in the terminal or the portable object.

In addition, the transmission of a biometric sample is carried out in a secure manner, thus limiting the risks linked to transmitting information used for the authentication.

Preferentially, the method of authentication according to an aspect of the disclosure comprises the following steps:
  transmission, by said authentication server, of a challenge to said portable object;
  encryption, by said portable object, of said biometric sample to be compared, using said challenge, delivering an encrypted biometric sample;
  transmission, by said portable object, of said encrypted biometric sample to said authentication server;
  validation, by said authentication server, of the response to said challenge;
  decryption, by said authentication server, of said encrypted sample, delivering a decrypted sample;
  determination, by said authentication server, of a signature to be authenticated, using said decrypted sample;
  authentication, by said server, of said user to be authenticated, by comparison of said signature to be authenticated with a reference signature, delivering an authentication decision, positive or negative;
  transmission, by said authentication server to said terminal, of said authentication decision.

As such, according to an aspect of the disclosure, a portion of the "tools" used for encrypting the biometric samples captured by the portable object is sent to the latter by the server, in the form of a challenge, subsequently making better security possible for the transmission of the biometric samples to be authenticated.

Indeed, the portable object then uses this challenge to encrypt the biometric sample to be authenticated and thus transmits an encrypted biometric sample to the authentication server. The sample encrypted as such cannot then be reused fraudulently (the "replay" principle), since another attempt at authentication would result in the generation of a new challenge, to which the preceding encrypted sample does not correspond.

In addition, the use of this challenge for the encryption makes it possible for the server to acknowledge that the encrypted biometric sample does correspond to a response to the challenge that was sent beforehand. The method according to an aspect of the disclosure thus makes it possible to be free of transfers comprising a non-encrypted biometric sample using the challenge.

The server therefore validates the response to the challenge and decrypts the encrypted biometric sample received, thus delivering a decrypted biometric sample, which it will then use to create a signature to be authenticated.

The server can then compare the signature to be authenticated with a reference signature, in order to deliver an authentication decision.

This decision can be positive or negative, according to a result of the comparison.

As such, the means of decrypting the encrypted biometric sample transmitted by the portable object is located in the server, and the comparison of the signatures and the authentication decision are carried out in the server, not in the terminal or the portable object, also allowing for improved security.

Once the authentication decision has been made, the server transmits it to the terminal, which uses it to accept or not accept the authentication of the user of the portable object.

For example, the authentication can be used to validate or not validate a transaction, using a chip card of a user and a payment terminal. In this case, the authentication makes it possible for the terminal to accept or not accept the transaction, according to the decision taken by the authentication server.

According to an advantageous embodiment, said step of transmitting a challenge to said portable object is carried out in response to an authentication solicitation, transmitted by said terminal or said portable object to said authentication server.

As such, the portable object, or the terminal, first solicits the server for an authentication. The server, in response to this authentication solicitation, transmits a challenge to the portable object, of which the latter will use in particular to encrypt a biometric sample to be compared and transmits it as a response to the server (as described above).

This dialogue between the server and the portable object, by the intermediary of the terminal, makes it possible to improve the security of the authentication. Indeed, in this case, the server does not accept to validate an encrypted biometric sample without having received beforehand an authentication solicitation and transmitted a challenge.

In order to further reinforce security, the challenge transmitted as a response to an authentication solicitation can be different at each new solicitation.

According to an advantageous aspect of the disclosure, said step of transmission of said encrypted biometric sample comprises the following steps:
  transmission, by said portable object to said terminal, of said encrypted biometric sample; and
  transmission, by said terminal to said authentication server, of said encrypted biometric sample.

As such, the biometric sample encrypted by the portable object is first transmitted by the latter to the terminal, which itself retransmits it to the server in charge of the authentication. Indeed, it is common for a portable object not to have the means of communication with an authentication server, and the terminal then makes the transmission possible between the portable object and the server.

According to another aspect of the disclosure, the biometric authentication method comprises a learning phase comprising the following steps:
  capturing of a reference biometric sample coming from an authorized user;

creation, in said authentication server, of said reference signature using said reference biometric sample;

storage, by said authentication server, of said reference signature in said authentication server.

This learning phase makes possible the creation, in the authentication server, of reference signatures, for example stored in a database, used during the authentication for the comparison with signatures to be authenticated (generated by the server using encrypted biometric samples transmitted by the portable object). This thus makes it possible to not have to store these reference signatures in a portable object, thus increasing its security and reducing its complexity, and therefore its cost.

According to an aspect of the disclosure, said biometric sensor belongs to the group comprising:
sensors of fingerprints;
sensors of palm prints;
sensors of retina prints;
sensors of iris prints;
sensors of facial shapes.

As such, an authentication based on different biometric characteristics is possible, according to the biometric sensor integrated into the portable object.

An aspect of the disclosure also relates to the computer programs that can be downloaded from at least one communication network and/or recorded on a medium that can be read by computer and/or executed by a processor, comprising programming code instructions for the implementation of the method of authentication described previously.

Another aspect of the disclosure relates to an authentication server comprising means of biometric authentication of a user to be authenticated using a portable object comprising at least one biometric sensor, said portable object being adapted to cooperate with a reading terminal.

According to an aspect of the disclosure, said means of biometric authentication include:
means of receiving, in a secure form, of an encrypted biometric sample coming from said portable object, after a step of capturing and encrypting said biometric sample to be compared coming from said user to be authenticated;
means of determining a signature to be authenticated using said biometric sample;
means of comparing said signature to be authenticated with a reference signature.

Preferentially, such an authentication server comprises:
means of transmitting a challenge to said portable object;
means of receiving and validating the response to said challenge coming from said portable object;
means of decrypting said encrypted sample, delivering a decrypted sample;
means of determining a signature to be authenticated, using said decrypted sample;
means of authenticating said user to be authenticated, by comparing said signature to be authenticated with a reference signature, delivering an authentication decision, positive or negative;
means of transmitting to said terminal, of said authentication decision.

According to an advantageous embodiment, such an authentication server comprises means of learning comprising:
means of capturing a reference biometric sample coming from an authorized user;
means of creating said reference signature using said reference biometric sample;
means of storing said reference signature in said authentication server.

As such, such a server is in particular able to implement the various steps of the method of authentication described hereinabove taking place in an authentication server.

Such a server can be in particular an authentication server of a banking organization, or an authentication server for securing a building, etc.

The disclosure also relates to a reading terminal of a portable object adapted to receive a portable object comprising at least one biometric sensor dedicated to a biometric authentication, with an authentication server, of at least one user to be authenticated.

According to an aspect of the disclosure, such a terminal comprises:
means of receiving an encrypted biometric sample coming from said user to be authenticated and transmitted by said portable object;
means of transmitting said encrypted biometric sample to said authentication server via a communication network;
means of receiving an authentication decision concerning said user to be authenticated according to a result of a comparison of a signature to be authenticated, created using said encrypted biometric sample, by said authentication server, with a reference signature, said decision being transmitted by said authentication server via said communication network.

Such a terminal is in particular able to implement the steps of the method of authentication described hereinabove taking place in the terminal.

Such a terminal can in particular be a payment terminal, a terminal making possible access to a building, etc.

Finally, an aspect of the disclosure relates to a portable object comprising at least one biometric sensor dedicated to a biometric authentication, with an authentication server, of at least one user to be authenticated, said object being adapted to cooperate with a reading terminal, said biometric sensor comprising means of capturing a biometric sample to be compared coming from said user to be authenticated.

According to an aspect of the disclosure, such a portable object also comprises:
means of receiving a challenge, transmitted by said authentication server;
means of encrypting said biometric sample to be compared, using said challenge, delivering an encrypted biometric sample;
means of transmitting said encrypted biometric sample to said authentication server via a communication network.

Preferentially, such a portable object is a chip card.

BRIEF DESCRIPTION OF THE DRAWINGS

Other characteristics and advantages shall appear more clearly when reading the following description of a preferred embodiment, provided as a simple and not limited example, and the annexed drawings, amongst wherein.

DETAILED DESCRIPTION OF ILLUSTRATIVE EMBODIMENTS

Figure 1:
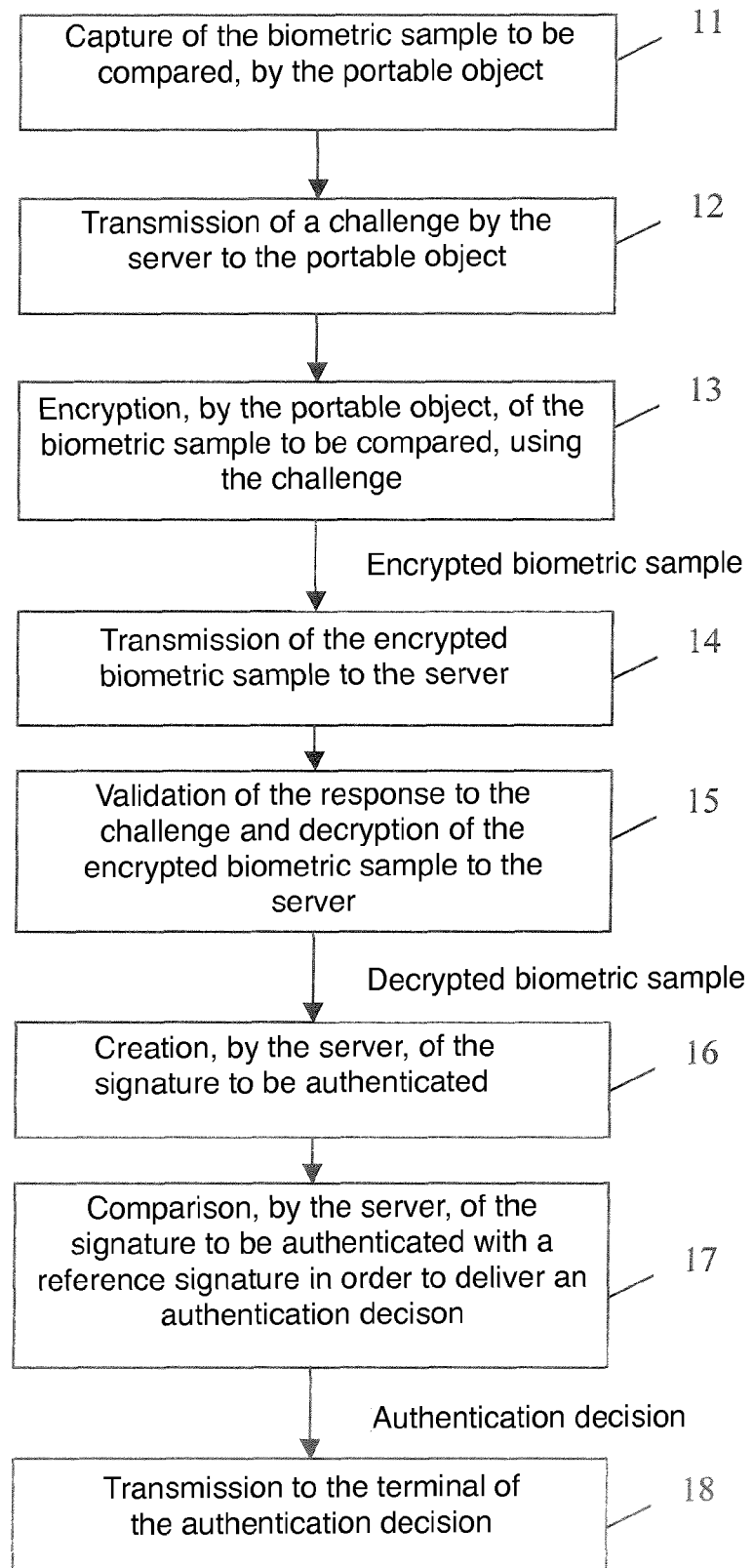
FIG. 1 shows the main steps of the biometric authentication method of a user to be authenticated according to a particular aspect of the disclosure.

What follows concerns the framework of a particular aspect of the disclosure according to which a user to be authenticated, holder of a chip card provided with a biometric sensor, desires to access a service requiring him to authenticate himself beforehand with a remote authentication server. This service that the user to be authenticated desires access can in particular be a banking service. For example, this service can be the payment for a product or a service by a purchasing user (which is the user to be authenticated) to a shop owner (selling user) by means of the chip card, which is a payment card issued by a bank, by the intermediary of a payment terminal (chip card terminal reader).

In other implementation modes, the portable object carrying the biometric sensor can be a key holder, a ring, a box of any such form, etc. The sensor can also be integrated into a device that provides other functions, such as a portable telephone.

The biometric sensor is, in the embodiment described, a fingerprint sensor. However, of course, the biometric sensor can be any other type of biometric sensor, for example one of the sensors belonging to the group comprising:
- sensors of palm prints;
- sensors of retina prints;
- sensors of iris prints;
- sensors of facial shapes, etc.

A combination of these sensors can also be provided.

Preferentially, in order for the purchasing user to be able to obtain an authorization by the bank issuing the payment card in order to carry out the payment, he needs to authenticate himself (as being the owner of the payment card or authorized user) with the remote authentication server belonging to the bank.

To do this, the purchasing user can insert the payment card into a payment terminal, adapted for reading the payment card and provided by the shop owner, while positioning the appropriate finger (for example the index finger of his right hand) on the print sensor of the payment card.

As such, the print sensor of the payment card captures a print, called the print to be compared (or biometric sample to be compared), of the index finger of the right hand of the purchasing user which is, such as is explained hereinafter, transmitted to the remote authentication server of the bank. The latter can then transmit to the payment terminal, a decision concerning the authentication of the purchasing user, a decision that it will have already made beforehand according to the result of a comparison of a signature to be compared (obtained using the print to be compared) with a reference signature.

This decision can be:
"the purchasing user is authenticated as being the holder of the card and is therefore (where applicable, within the limit of the available balance on his bank account) authorized to carry out the payment" or
"purchasing user is not authenticated as being the holder of the card and therefore is not authorized to carry out the payment".

As such, for example, the key entry of the personal secret code can be advantageously replaced, or supplemented, by the entry of the print of the owner in order to authenticate the owner of the payment card.

Figure 2:
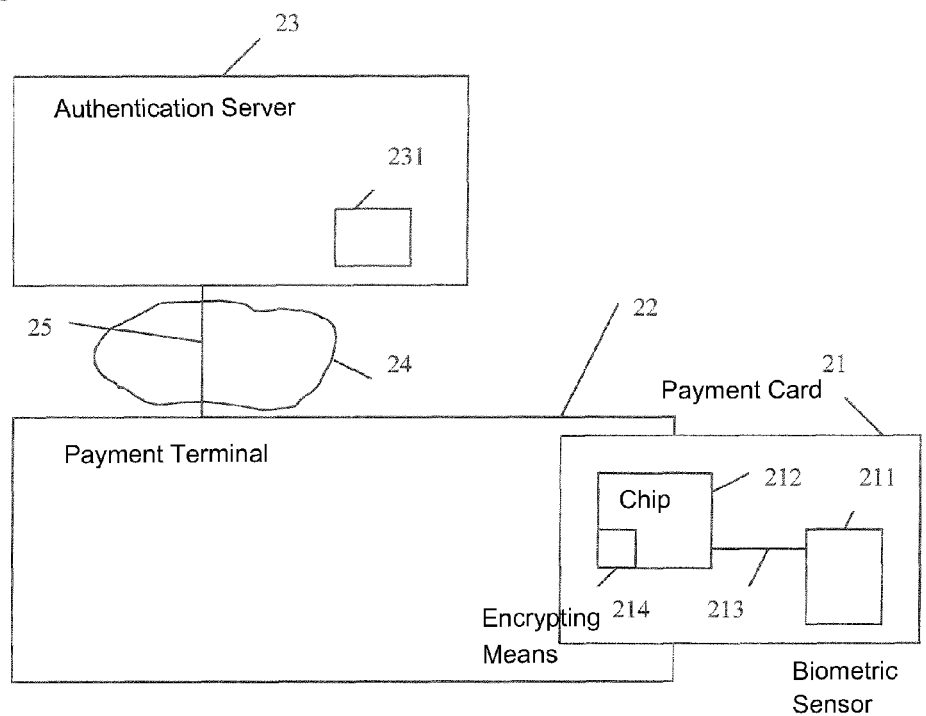
FIG. 2 shows a system according to the invention wherein can be implemented the biometric authentication method in FIG. 1.

In relation with FIG. 2, a system implementing an aspect of the disclosure is presented hereinbelow, wherein can be implemented the biometric authentication method according to the aforementioned particular aspect of the disclosure.

The system comprises:
- the payment card (chip card) 21 whereon is integrated the fingerprint sensor 211 (biometric sensor) which is electrically connected via an electrical connection element 213 (for example one or several electrical tracks) to the chip 212 of the card;
- the payment terminal 22 (reading terminal of the chip card) which is adapted in a conventional manner to receive the payment card 21;
- the authentication server 23 which is for example located in the bank.

The terminal is connected to the server 23 via a communication network 24 which is for example the Internet network by means, for example of a wireless link 25 which therefore allows for the exchanging of information between the payment terminal 22 and the authentication server 23.

The chip 212 of the card 21 comprises electrical tracks provided to cooperate with contact elements of the payment terminal in order to allow for the exchanging of information, in the form of electric signals, between the payment card 21 and the payment terminal 22 when the card 21 is inserted in the terminal 22. What shall now follow (such as is shown in FIG. 2) is a configuration wherein the chip card 21 is inserted into the reader 22.

Figure 4:
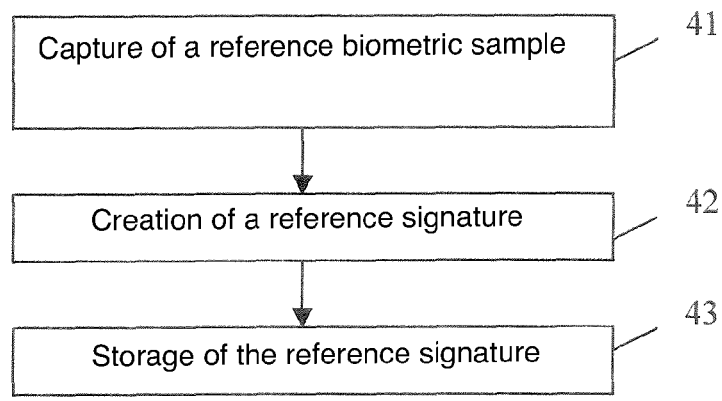
FIG. 4 shows the steps in the learning phase of the biometric authentication method according to the aforementioned particular aspect of the disclosure.

In relation with FIGS. 1 and 4, the main steps of the biometric authentication method of the user to be authenticated are presented hereinbelow, according to the aforementioned particular aspect of the disclosure.

Preferentially, the method comprises a learning phase and a verification phase.

This learning phase is described hereinafter, in relation to FIG. 4. For example, this phase is carried out by the service manager, linked with the authentication server.

In a step 41 of capturing a reference print (or reference biometric sample), the holder (authorized user) of the payment card 21 positions the appropriate finger (index finger of his right hand for example, such as indicated hereinabove) on a fingerprint sensor (not shown) connected to the authentication server. As such, the print sensor records the print of the index finger of the right hand of the holder which constitutes the reference print.

The reference print is then transmitted to the authentication server 23.

Then, in a step 42 of creating a reference signature (using the reference print), a processing unit (231), for example a microprocessor, of the authentication server 23 generates the reference signature by applying a signature creation algorithm, known per se, to the reference sample.

Then, in a step of storage 43 of the reference signature, the authentication server 23 stores the reference signature in a memory (not shown in FIG. 2) for example internal to the server 23.

The phase of verification is now described, in relation with FIG. 1.

In a step 11 of capturing a biometric sample to be compared (or print to be compared), the purchasing user (user to be authenticated) holder of the payment card 21, positions the index finger of his right hand on the fingerprint sensor 211 of the card 21. As such, the print sensor 211 records the print of the finger of the holder which constitutes the print, or sample, to be compared.

Then, this print to be compared is transmitted from the sensor 211 to the chip 212 of the payment card 21 via an electrical connection 213.

Upon reception of a challenge transmitted by the authentication server 23 during a step 12, the chip card carries out an encryption of the biometric sample to be compared, during a step 13.

The encryption of the biometric sample to be compared is carried out by the means of encrypting 214 present in the chip 212 of the payment card 21, that implements an encryption, by means of a determined encryption algorithm also known by the means of processing 321 of the authentication server 23.

This encryption takes into account the challenge sent by the server, and makes it possible subsequently to the server to validate the transmission of the encrypted biometric sample.

Indeed, only the authentication server 23 and the payment card 21 know the encryption algorithm that is used.

On the other hand, a new challenge is generated by the authentication server 23 at each implementation of the method of authentication according to an aspect of the disclosure.

As such, to a challenge sent by the server corresponds a single transmission of an encrypted biometric sample by the chip card.

Figure 3:
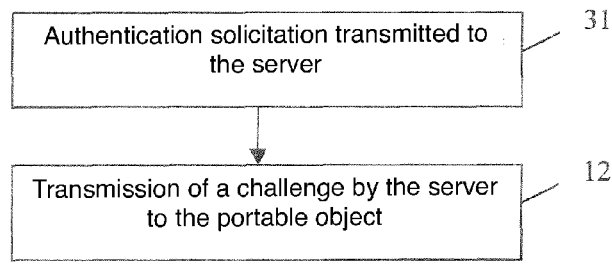
FIG. 3 shows the main sub-steps in a step of identifying the payment card by the authentication server according to the aforementioned particular aspect of the disclosure.

In addition, as described in relation to FIG. 3, the challenge is sent, during a phase making possible the identification of the card, by the server in response to an authentication solicitation, transmitted by the terminal or the card, during a step 31, prior to the step 12 of transmitting the challenge.

As such, the use of such a challenge, in response to an authentication solicitation, makes it possible for example to ensure than an ill-intentioned user, having the means of intercepting the sample to be compared in the terminal, cannot carry out a "replay", i.e. simulate request to authenticate an authorized user with the authentication server, by simply transmitting the sample to be compared that he has intercepted beforehand (thanks to the means of interception), during an authentication of an authorized user.

Indeed, the server, since it has not received an authentication solicitation beforehand, and therefore has not transmitted a challenge, cannot validate the biometric sample received.

In addition, even if the ill-intentioned user transmits an authentication solicitation to the server, the ill-intentioned user cannot send back to the server the correctly-encrypted biometric sample, once he has received the challenge, since he only has a sample that is already encrypted, using a preceding challenge.

As such, during the step of analysis, the server can realize that the authentication attempt is fraudulent, which, for example, blocks the authentication process, and in our example, the transaction.

As such, the implementation of the authentication solicitation and of the challenge makes it possible to secure the method of authentication according to an aspect of the disclosure.

During a following step of transmission 14, the chip 212 of the payment card 21 transmits the encrypted biometric sample to the authentication server, by the intermediary of the terminal 22.

As such, the payment terminal 22 (for example via the electrical tracks of the chip 212 and the contact elements of the payment terminal 22, or via a link without contact) receives an encrypted biometric sample from the card and retransmits it to the authentication server 23 (via the link (wired or wireless) 25 of the communication network 24).

As such, the terminal is used only for the transfer of an encrypted biometric sample from the chip card to the authentication server. The terminal therefore does not hold any non-encrypted biometric sample to be compared, or any signature to be compared, which reinforces the security of the method according to an aspect of the disclosure.

The server therefore receives the encrypted biometric sample and validates, during a step of validation 15, the response to the challenge.

As such, if the server acknowledges that the encrypted biometric sample transmitted does correspond with the challenge sent, it then decrypts the encrypted biometric sample in order to obtain a decrypted biometric sample.

If it does not acknowledge a response to the challenge sent beforehand, it does not continue with the procedure of decrypting the encrypted biometric sample and ends the authentication in progress.

The server, for example the aforementioned processing unit 231 of the server, uses, during a step of creating the signature 16, this decrypted biometric sample in order to create a signature to be authenticated, intended to be compared to the reference signature created beforehand (step 42 in FIG. 4 described hereinabove).

The signature to be authenticated is generated by applying the signature creation algorithm to the decrypted biometric sample.

Then, in a step 17 of comparing, the authentication server 23 (for example by the intermediary of its processing unit 231) compares the signature to be authenticated with the reference signature stored beforehand and takes a decision concerning the authentication of the user to be authenticated (such as indicated hereinabove), according to a result of the comparison.

Finally, in a step 18, the authentication server 23 transmits, to the payment terminal 22 (via the wireless link 25), the authentication decision concerning the authentication of the user to be authenticated.

In relation with FIG. 5, the simplified structure of an authentication server according to the particular embodiment described hereinabove is shown.

Figure 5:
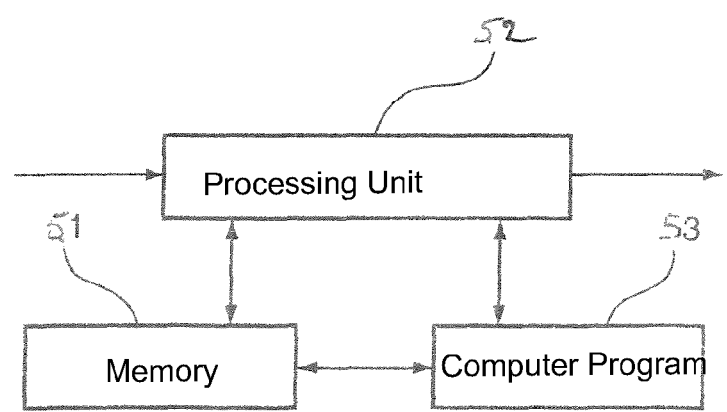
FIG. 5 shows the simplified structure of an authentication server according to the particular aspect of the disclosure.

As shown in FIG. 5, such a server comprises a memory 51 (M), a processing unit 52 (P), provided for example with a microprocessor, and driven by the computer program 53 (Pg), implementing the method of authentication according to an aspect of the disclosure.

At initialization, the code instructions of the computer program 53 are for example loaded into a RAM memory before being executed by the processor of the processing unit 52.

The microprocessor of the processing unit 52 implements the steps of the method of authentication described hereinabove in such a way as to authenticate a user to be authenticated.

For this, the authentication server comprises means of biometric authentication of the user to be authenticated using a chip card comprising at least one biometric sensor, said chip card being adapted to cooperate with a reading terminal of the chip card.

The means of biometric authentication include:
  means of transmitting a challenge to said portable object;
  means of receiving, in a secure form, an encrypted biometric sample coming from said portable object, after a step of capturing and of encrypting said biometric sample to be compared coming from said user to be authenticated;

means of validating the response to said challenge coming from said portable object;

means of decrypting said encrypted sample, delivering a decrypted sample;

means of determining a signature to be authenticated using said decrypted biometric sample;

means of comparing said signature to be authenticated with a reference signature;

means of transmitting to said terminal, an authentication decision taking into account a result of the comparison.

The means of authentication also include means of implementing the learning phase of the method of authentication described hereinabove.

These means of biometric authentication are driven by the microprocessor of the processing unit 52.

Of course, this disclosure also applies to the restriction of access to a protected site, or to a data server or a network, or a vehicle, and more generally to a device or a system. In this case, the user to be authenticated can for example authenticate himself with a remote authentication server by inserting his chip card with print sensor (whereon he positions the appropriate finger) in an adapted reader.

This disclosure can also be applied to the case of restricting the access to a mobile telephony service or even to any application requiring a restriction of access to certain persons or animals.

An aspect of the disclosure, in at least one of its embodiments, provides a biometric authentication technique based on portable objects with a biometric sensor that makes it possible to provide a secure authentication in an effective manner, without substantially increasing the complexity or the cost of these portable objects.

An aspect of the disclosure provides such a technique that avoids transferring sensitive data to a terminal, and the storage of such data on the portable object.

An aspect of the disclosure limits the treatments carried out in the portable object, in particular in relation to the objects that carry out the authentication themselves.

Although the present disclosure has been described with reference to one or more examples, workers skilled in the art will recognize that changes may be made in form and detail without departing from the scope of the disclosure and/or the appended claims.

The invention claimed is:

1. A biometric authentication method, with an authentication server, of a user to be authenticated, using a portable object comprising at least one biometric sensor, the portable object being adapted to cooperate with a terminal, the method comprising:

capturing, by the portable object, a biometric sample to be compared, coming from the user to be authenticated, transmitting, by the authentication server, a challenge to the portable object; encryption, by the portable object, of the biometric sample to be compared using the challenge, generating an encrypted biometric sample;

transmitting, by the portable object, the encrypted biometric sample to the authentication server, as a response to the challenge, and validation, by the authentication server, of the response to the challenge;

decryption, by the authentication server, of the encrypted biometric sample to obtain the biometric sample;

determining, by the authentication server, a signature to be authenticated using the biometric sample, the signature being determined by applying a signature creation algorithm to the biometric sample; and comparing the signature to be authenticated with a reference signature and thereby authenticating the user without any signature transiting through the terminal or through a communication network and without any biometric sample being directly used in the server for the step of comparing.

2. The biometric authentication method forth in claim 1, wherein the method comprises:

in response to comparing the signature to be authenticated with the reference signature, providing an authentication decision, positive or negative; and transmission, by the authentication server to the terminal, of the authentication decision.

3. The biometric authentication method set forth in claim 1, wherein transmitting a challenge to the portable object is carried out as a response to an authentication solicitation, transmitted by the terminal or the portable object to the authentication server.

4. The biometric authentication method as set forth in claim 1, wherein transmitting the encrypted biometric sample comprises the following steps:

transmission, by the portable object to the terminal, of the encrypted biometric sample; and transmission, by the terminal to the authentication server, of the encrypted biometric sample.

5. The biometric authentication method as set forth in claim 1, wherein the method comprises a learning phase comprising the following steps:

capturing of a reference biometric sample coming from an authorized user;

creation, in the authentication server, of the reference signature using the reference biometric sample; and storage, by the authentication server, of the reference signature in the authentication server.

6. The biometric authentication method as set forth in claim 1, wherein the biometric sensor belongs to the group consisting of:

sensors of fingerprints;
sensors of palm prints;
sensors of retina prints;
sensors of iris prints;
sensors of facial shapes.

7. The method set forth in claim 1, wherein the portable object is a chip card.

8. A non-transitory medium that can be read by computer and comprising programming code instructions stored thereon for execution of a biometric authentication method, with an authentication server, of a user to be authenticated, using a portable object comprising at least one biometric sensor, the portable object being adapted to cooperate with a terminal, the method comprising:

transmitting, by the authentication server, a challenge to the portable object;

receiving a response from the portable object to the challenge, wherein the response to the challenge includes an encrypted biometric sample, by the authentication server, and validating, by the authentication server, the response to the challenge;

decrypting, by the authentication server, the encrypted biometric sample to obtain the decrypted biometric sample;

determining, by the authentication server, a signature to be authenticated using the biometric sample, the signature being determined by applying a signature creation algorithm to the biometric sample; and comparing the signature to be authenticated with a reference signature and thereby authenticating the user without any signature transiting through the terminal or through a communication network and without any biometric sample being directly used in the server for the step of comparing.

9. An authentication server comprising:
a memory comprising program code instructions stored thereon; and
a hardware processing unit configured by the program code instructions to execute the following steps:
biometric authentication of a user to be authenticated using a portable object comprising at least one biometric sensor, the portable object being adapted to cooperate with a reading terminal, wherein biometric authentication includes:
transmitting a challenge to the portable object;
receiving a response from the portable object to the challenge, wherein the response to the challenge includes an encrypted biometric sample;
validating the response to the challenge;
decrypting the encrypted biometric sample to obtain the biometric sample;
determining a signature to be authenticated using the biometric sample, the signature being determined by applying a signature creation algorithm to the biometric sample; and
comparing the signature to be authenticated with a reference signature and thereby authenticating the user without any signature transiting through the terminal or through a communication network and without any biometric sample being directly used in the server for comparing.

10. The authentication server set forth in claim 9, wherein:
comparing provides an authentication decision, positive or negative; and
the authentication server is configured to transmit to the terminal, the authentication decision.

11. The authentication server as set forth in claim 9, wherein the processing unit is further configured by the program code instructions to:
capture a reference biometric sample coming from an authorized user;
create the reference signature using the reference biometric sample; and
store the reference signature in the authentication server.

12. A reading terminal adapted to receive an encrypted biometric sample from a portable object comprising at least one biometric sensor dedicated to a biometric authentication, with an authentication server, of at least one user to be authenticated, wherein the terminal comprises:
a memory comprising program code instructions stored thereon; and
a hardware processing unit configured by the program code instructions to execute the following steps:
receiving a challenge from the authentication server and applying the challenge to the portable object;
receiving the encrypted biometric sample coming from the user to be authenticated and transmitted by the portable object as a response to the challenge;
transmitting the encrypted biometric sample to the authentication server via a communication network; and
receiving an authentication decision concerning the user to be authenticated according to a result of a comparison of a signature to be authenticated with a reference signature, the signature to be authenticated being created using a decryption of the biometric sample and applying a signature creation algorithm by the authentication server, the authentication decision being received from the authentication server via the communication network, and thereby authenticating the user without any signature transiting through the terminal or through the communication network and without any biometric sample being directly used in the server for comparing.

* * * * *